United States Patent [19]

Leva

[11] Patent Number: 4,814,117
[45] Date of Patent: Mar. 21, 1989

[54] PACKING SUPPORT FOR GAS - LIQUID CONTACT TOWERS

[76] Inventor: Max Leva, 1600 Munhall Rd., Pittsburgh, Pa. 15217

[21] Appl. No.: 135,720

[22] Filed: Dec. 21, 1987

[51] Int. Cl.$^4$ ............................................. B01F 3/04
[52] U.S. Cl. ................................................... 261/94
[58] Field of Search ............... 261/94, 97, 98; 52/664, 52/665

[56] References Cited

U.S. PATENT DOCUMENTS

| | | | |
|---|---|---|---|
| 2,098,667 | 11/1937 | Miller | 52/94 |
| 2,158,229 | 5/1939 | Goldthwaite | 52/664 |
| 2,283,307 | 5/1942 | Barry et al. | 52/665 |
| 2,987,039 | 6/1961 | HArtsough | 52/665 |
| 3,653,845 | 4/1972 | Moravec | 52/94 |
| 4,003,178 | 1/1977 | Douthwaite | 52/664 |
| 4,275,018 | 6/1981 | Braun | 261/94 |
| 4,452,025 | 6/1984 | Lew | 52/665 |
| 4,472,325 | 9/1984 | Robbins | 52/97 |
| 4,476,069 | 10/1984 | Harper et al. | 52/97 |
| 4,557,876 | 12/1985 | Nutter | 52/94 |

FOREIGN PATENT DOCUMENTS 2924516 1/1981 Fed. Rep. of Germany ........ 261/94

Primary Examiner—Tim Miles
Attorney, Agent, or Firm—William J. Ruano

[57] ABSTRACT

A support for randomly dumped packings in a gas-liquid contact tower, such as a distillation tower. The support may be horizontal grid,-through the openings of which vertical rods are integrally secured, serving as stilts to directly support, on their top ends, the packings so as to eliminate blocking of air or liquid passage through the support. The rods may be solid or tubular and in some cases may also extend downwardly of the grid terminating in a pointed lower end to serve as drip points. The grid may be of various shapes.

20 Claims, 1 Drawing Sheet

PACKING SUPPORT FOR GAS - LIQUID CONTACT TOWERS

This invention pertains to devices that are used to support randomly dumped packings in essentially vertical towers. Such towers are used extensively in a great variety of operations and processes. Examples are found notably in distillation, gas absorption as well as in the general processing of gases as for instance in gas cooling, humidification and dehumidification or scrubbing of finely divided solid particles from gas or vapor streams, as well as many other applications.

Whereas all the operations cited are specific in nature, they all have, however, in common that a liquid stream flows downwardly, whereas a gas or vapor stream passes usually upwardly (but may flow downwardly as well, as, for example, in co-current flow).

Although the invention is here described by making reference only to gas-liquid flow, it is expressly pointed out that this description comprises all vapor-liquid systems as well.

BACKGROUND OF THE INVENTION

The functioning of randomly dumped tower packings in gas-liquid service is an art about which much has been written. For a detailed survey of this topic, presented all in one place, reference is, however, made to "Tower Packings and Packed Tower Design" (abbreviated and hereinafter referred to as TP and PTD), a book written by the inventor and published in 1953 by the United States Stoneware Company, then of Akron, Ohio.

One of the important aspects of the design and functioning of beds of randomly dumped packings involves proper design of the support plate that holds the packed bed in place in the tower. This topic has been dealt with in detail on pages 25 to 27 of TP and PTD. Suffice it, therefore, to say here that with ordinary flat support plates, in which the openings serve both liquid flow downwardly as well as gas flow upwardly, the packing pieces on top of the flat support plates tend to block the openings, with the result that the gas-liquid carrying capacity of the packed bed is thereby greatly impaired.

Having recognized this shortcoming of ordinary flat perforated supports, the author has, therefore, proposed a then novel construction embodying the "gas-injection" principle, described in TP and PTD. The principle was then implemented by simply providing flat perforated supports with a multitude of risers carrying perforations through which only the gas was admitted, separately, into the packing, a few inches above the lower terminal end of the packed bed. The liquid, on the other hand, would flow past and between the risers downwardly, and after having collected to become combined into relatively shallow liquid pools, only the liquid would discharge through the openings in the flat bottom portion of the device.

Having thus provided separate ports for gas and liquid passage, a significant improvement of the ordinary flat packing support plate had been achieved. However, since the original riser construction did not appear as economical for use in large diameter towers as was deemed necessary, the gas-injection support plates were modified by replacing the multitude of risers by longitudinal, perforated beams. This type of construction is shown in "Random Packings and Packed Towers", Design and Applications, by Ralph F. Strigle, Jr., pages 201 to 204, published in 1987 by Gulf Publishing Company.

Whereas, as already stated, the constructions embodying the gas-injection principle represent an important improvement over ordinary flat support plates, they do however still suffer from a residual drawback which is caused through the contacts which the packing pieces make with those openings that are in the flat bottom portions of gas-injection support plates. This is felt particularly in the beam type construction where the packing elements, jammed in between the beams, caused by the weight of the packing above, will block the bottom openings, causing the relatively shallow liquid pools found normally there to increase in depth. This is especially severe at elevated irrigation rates, with the result that the pool level rises and causes the liquid to discharge through openings in the beams, which were originally designed to accomodate only gas flow. It is obvious, therefore, that through this blockage of the openings by the jammed-in packing elements, the functioning of the gas-injection riser devices have been largely negated.

It has now been found surprisingly and entirely unexpectedly that the deficiencies of the gas-injection type devices just explained are completely remedied by the present invention.

SUMMARY OF THE INVENTION

In essence, the present invention comprises standard flat packing support devices as defined, for example, by wide open grids, the individual bar elements of which are provided with a multitude of vertical stilts, fastened to the bars of the flat devices by welding or other conceivable methods. The stilts extend upwardly of the bars, and are arranged in such close proximity that the packed bed is effectively supported and kept away from the top surface of the bars.

Whereas, it is thus achieved that the terminal lower end of the packed bed is not in contact with the top of the grid structure, the upwardly extending stilts, reaching into the terminal lower end of the packed bed to various extents are by virtue of their support contact with the irrigated packing elements instrumental in drawing off the irrigating liquid and discharging this liquid downwardly. It is thus seen that the stilts have the double purpose of firstly supporting the packed bed and keeping it off the top surface of the grid and, secondly, of discharging a portion of the irrigating liquid downwardly, and thus encourage an important portion of the liquid to by-pass the empty centers of the grid openings. This, in effect, means that less flow resistance is offered to the rising gas stream that passes upwardly through the individual grid openings, and into now almost fully exposed packed bed lower end crossection.

It is obvious that with this type of construction, the ultimate is approached as far as lessening of the mutual effects of downward liquid flow and upward gas flow through the passageways in packing support plates is concerned.

BRIEF DESCRIPTION OF THE DRAWING

Having now presented my invention in principle, FIGS. 1 to 8 will serve to elaborate on the implementation of the invention by way of examples.

BRIEF DESCRIPTION OF THE PREFERRED EMBODIMENTS

Figure 1:
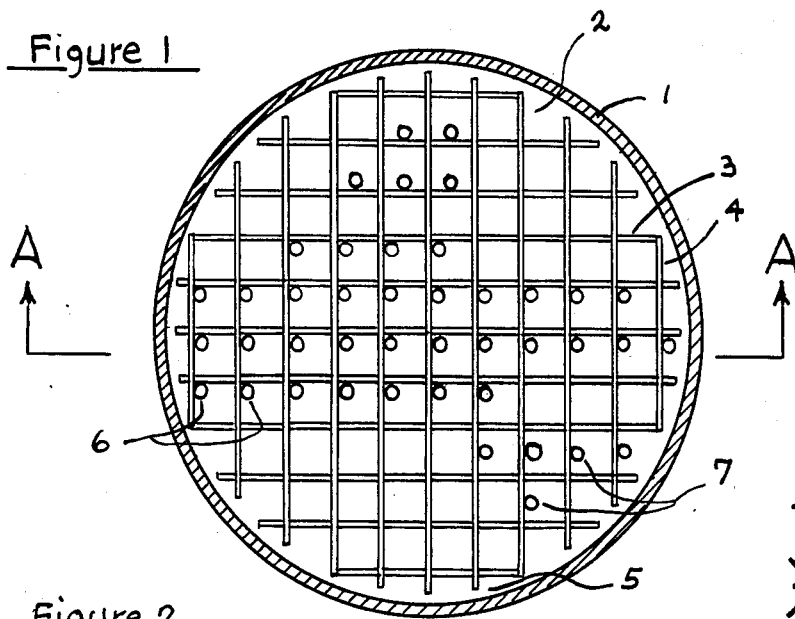
FIG. 1 is a plan view of a typical implementation of the invention.

Referring now to FIG. 1, the shell of the tower which contains the packed bed is designated by numeral 1. Most frequently the tower shell is composed of metal, such as steel for instance, but it may be composed of plastic or other kinds of material. The support plate inside of the tower is denoted by numeral 2. It is noted that the support plate is in the form of a grid composed of two layers of bar stock which are at an angle of 90 degrees to each other. The lower layer of bar stock, being shown as extending horizontally, is denoted by numeral 3, whereas the upper layer of bar stock, shown vertically arranged is denoted by numeral 4.

Most frequently, the bar stock material will be of metal, but other materials, such as plastics, glass, wood, or other materials of construction may be used instead. Most frequently, the two layers of bar stock are permanently joined at their points of contact, as in the case of metal construction, by welding or soldering. However, the upper layer of bar stock may merely rest on the lower layer of bar stock, being held in place by clamping means or the like.

It is noted that the grid formed by the two layers of bar stock is not in contact with the tower shell, the clearance being denoted by numeral 5 (FIG. 1). It is usually the practice to maintain such a clearance 5, whereby the support plate may be readily removed from the tower. It is noted that the device making up the grid structure is all in the form of one non-partitioned circular piece. Whenever that is the case, the entire fabricated grid shall have to be lowered into the tower shell, preferably from the upper end of the shell, and have it rest on proper supports, such as peripheral support lugs fastened to the inside of the tower shell. In cases where the tower diameter is, however, too large for lowering a completely assembled grid support into the shell, the grid may be made in sections, permitting introduction through proper size man ways.

Continuing now further with the details of FIG. 1, the stilts are shown as small circles and denoted by numerals 6 and 7. It will be seen that rods or stilts 6 are provided in corners of the rectangular cells making up the grid, whereas stilts 7 have been attached to bars of the upper layer of bar stock only. If of metal construction, attachment of the rods or stilts is most conveniently done by welding, soldering or similar techniques. If the support grid is made of plastic material, it may be found practical to produce the rods or stilts as an integral part of those bar stock members that face the bottom end of the packed bed. This may be done conveniently by any suitable method of plastic manufacturing technique, as for instance by injection molding or other.

The stilts being composite with the bar stock or other structural parts may have various shapes, such as rod-like, triangular, with apex pointing upward, forked or others, as long as the important purpose of the stilts is maintained, namely, to keep the packed bed essentially off the support grid. Additional variations of shapes which the stilts may have shall be considered later on in this specification.

Figure 2:
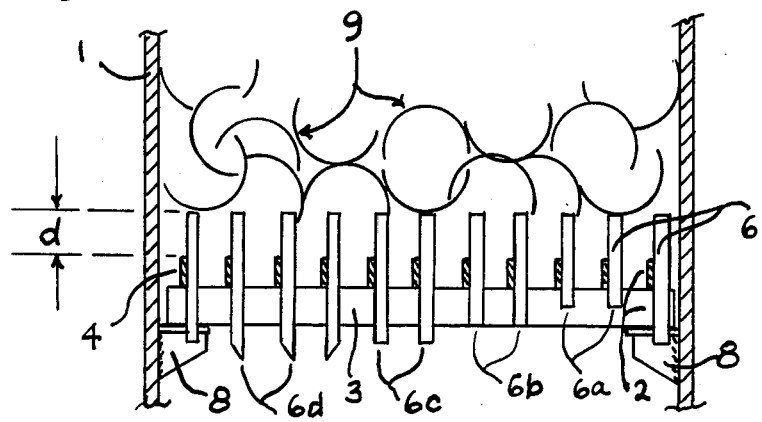
FIG. 2 is a vertical cross-sectional view of the device shown in FIG. 1, taken along line A—A.

Examining now FIG. 2 which is a view of FIG. 1 as it would appear in section through line A—A, the tower shell is again denoted by numeral 1. The lower bar stock members are denoted by numeral 3, whereas the upper bar stock members are shown by numeral 4, all as before. The support plate, thus formed is denoted by numeral 2, is seen to rest on peripheral support lugs 8, which are fastened to the inside tower shell 1. The stilts, denoted by numeral 6, support the randomly dumped tower packing, which is denoted by numeral 9.

In order to achieve the objective of holding the packing elements effectively above the upper surface of the supporting device, it is first of all required that for a given size of packing pieces, the stilts must be spaced in sufficient proximity to each other. Secondly, the stilts must extend sufficiently upwardly from the supporting device. Generally speaking, in order to obtain the required hydraulic results which are achieved by keeping the packing elements effectively off the supporting device, it will suffice to select these variables such that distance "d", so indicated in FIG. 2, shall not be effectively smaller than 0.25 inch.

Whereas, as has been pointed out, stilts 6 and 7 must extend well above the top of bar stock members 4, they do not necessarily have to extend below the lower surface edge of bar stock members 3. This would, for example, be implemented by stilts designated by numerals 6a. On the other hand, the stilts may extend downwardly as far as the lower edge of bar stock member 3, as for example, by the stilts denoted by numeral 6b, or they may even extend lower as denoted by stilts 6c. For purposes of providing drip points from which the liquid would be discharged from the stilts more positively, the lower ends of the stilts may be pointed, as is shown by stilts designated by numeral 6d.

The stilts are made frequently of solid bar stock. If circular, the diameter could extend from as small as 0.1 inch or less for generally small diameter towers, carrying relatively light weight packing, to as much as 1.0 inch or more for large towers, carrying heavy layers of packings, such as, for example, large ceramic saddles that are used in deep beds in sulfuric acid technology towers.

Figures 3, 4:
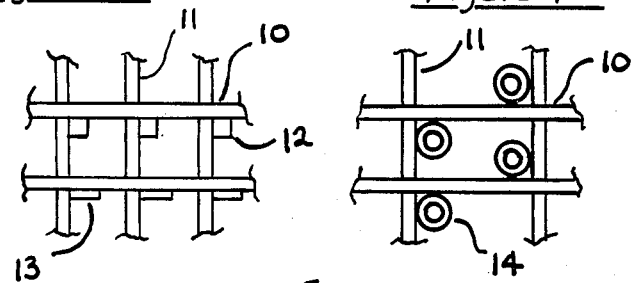
FIG. 3 is a fragmentary plan view which shows a modification in construction of the aforementioned stilts.
FIG. 4 is a fragmentary plan view which shows a further modification in regard to construction of the stilts.

Referring to FIG. 3, horizontal bar stock members are denoted by numeral 10, whereas the bar stock members running vertically are denoted by numeral 11. The shapes of the stilts may, of course, vary. Thus stilts of square cross-section are denoted by numeral 12, whereas rectangularly shaped cross-section stilts are indicated by numeral 13. Obviously, it would all be in the spirit of the invention to consider other cross-sections as well, as for example, polygonal or triangular or others.

In cases where solid bar stock stilts are used, the irrigating liquid is withdrawn through contact from the lower end of the packed bed and descends downwardly along the outside surface of the stilts. An additional advantage is obtained by utilizing tubular stilts, whereby a portion of the descending liquid is withdrawn by way of the inside tubular channel, thus implementing, even further, the desired separation between gas and liquid flow paths, as these are implemented to various degrees by various kinds of support plates for randomly dumped packings.

The use of stilts made of tubular means is indicated in FIG. 4, wherein rectangular design, horizontal as well as vertical bar stock members are denoted by numerals 10 and 11, respectively. The tubular means stilts shown in FIG. 4 are of circular crossection. It would, of course, be within the spirit of the invention to employ tubular means stilts that have other crossections, such as, for instance, elliptical, hexagonal or polygonal. In order to derive the utmost benefit from the inside channels in stilts of tubular means, it should be endeavored to make the inside flow channel in the tubular stilts as large as possible, without compromising the physical strength of the stilts to support the packed bed.

Not only may stilt construction details vary within the spirit of the invention, but the grid construction may vary, as well.

Figure 5:
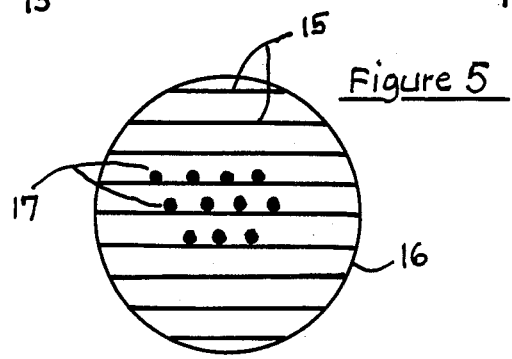
FIG. 5 is a plan view which shows a simplified grid design.

Thus, FIG. 5 shows a device comprising a series of closely spaced-together, parallel bars 15, fastened, as for instance by welding, to a peripheral ring 16, with stilts 17 as shown in typically close relationship.

Figure 6:
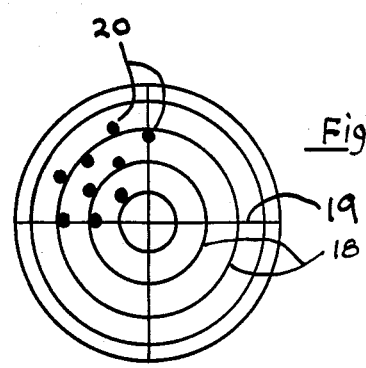
FIG. 6 is a plan view of a further modification of the grid design.

Similarly, FIG. 6 shows a device in the form of concentric circles, denoted by numeral 18, fastened to a supporting cross beam 19, with stilts 20 shows again in typically close proximity.

The construction shown in FIGS. 5 and 6 are most suitable for towers of relatively small diameters.

Figure 8:
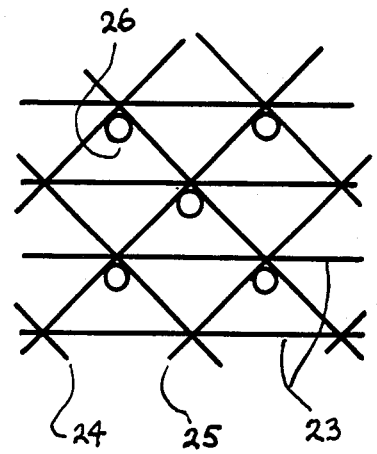
FIG. 8 is an enlarged, fragmentary plan view of still another way in which the grid may be constructed.
Figure 7:
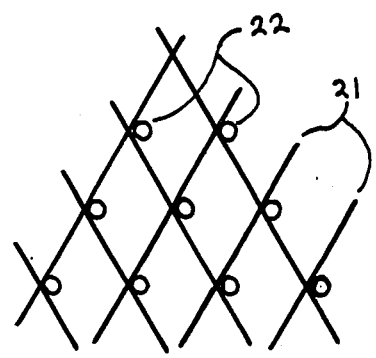
FIG. 7 is an enlarged fragmentary plan view of still another grid design.

For larger diameter towers, the grid constructions shown in FIGS. 7 and 8 would be preferable. In FIG. 7, the grid is constructed along the design of a parallelogram and is denoted by numeral 21. The grid may be comprised of a single layer or of two superimposed layers. This design would lend itself quite readily to sectional construction of exceptional strength, to be fit for introduction into towers by way of properly sized man ways. The stilts referred to by numeral 22 are laid out in the design at the required locations and of the required height, all in accordance with packing size contemplated, to prevent the packing to make any important measure of contact with the top surface of the support grid. In order to keep the stilt concentration (number of stilts per square foot of tower cross-section) to as low a value as feasible one may use a somewhat larger size of randomly dumped packing for the first few inches on top of the grid, to be followed by the randomly dumped packing intended for the operation for the remainder of the packed bed.

Finally, FIG. 8 shows a grid construction of exceptional mechanical strength. There are actually three layers of bar stock defining a triangular layout. The lowest layer, denoted by numeral 23 carries the two higher layers denoted by numerals 24 and 25. The stilts shown by numeral 26 are again laid out in typical fashion and in accord with the underlying principles of the invention.

Thus it will be seen that I have provided a highly improved support for randomly dumped packing in a gas-liquid contact tower, which will effectively eliminate blockage or restriction of vertical liquid or gas flow, also which involves a minimum number of inexpensive parts which are easy to assemble in the tower.

While I have illustrated and described several embodiments of my invention, it will be understood that these are by way of illustration only and that various changes and modifications may be contemplated in my invention and within the scope of the following claims.

I claim:

1. In a gas-liquid contact tower for distillation, gas absorption and related mass transfer operations, the improvement comprising a packing support plate of a given depth extending horizontally in said tower and having a plurality of spaced apart openings for liquid and gas passage, and a plurality of vertically upwardly extending rods spaced apart from each other and which are attached to said support plate through its depth and adjacent said openings and upwardly thereof to serve as stilts for supporting, at the top ends of said rods, randomly dumped tower packing.

2. Apparatus as recited in claim 1 wherein said rods are tubular.

3. Apparatus as recited in claim 1 wherein said support plate is in the form of a grid.

4. Apparatus as recited in claim 3 wherein said grid is formed of a first layer of spaced parallel bars having superimposed a second layer of spaced parallel bars extending upwardly and at right angles to said first layer of bars, said rods being integrally secured to said super-imposed spaced parallel bars but extending upwardly beyond the top ends of said last mentioned bars.

5. Apparatus as recited in claim 4 wherein said rods extend only upwardly of said first layer of spaced parallel bars.

6. Apparatus as recited in claim 4 wherein said rods are attached to the corners of the openings formed by said first and second layers of bars.

7. Apparatus as recited in claim 4 wherein said rods are attached between the corners of the openings formed by said first and second layers of bars.

8. Apparatus as recited in claim 4 wherein said rods extend above the top of said second layer of spaced parallel bars by at least ¼ inch.

9. Apparatus as recited in claim 4 wherein said rods are tubular.

10. Apparatus as recited in claim 4 wherein said rods extend both upwardly and downwardly of said first layer of spaced parallel bars.

11. Apparatus as recited in claim 10 wherein downwardly extending rods have pointed lower ends to serve as drip points.

12. Apparatus as recited in claim 4 wherein said rods are solid and of rectangular cross section.

13. Apparatus as recited in claim 12 wherein said rods are attached to the corners formed by said first and second layers of bars.

14. Apparatus as recited in claim 3 wherein said grid comprises parallel spaced bars.

15. Apparatus as recited in claim 3 wherein said grid comprises spaced circular concentric bars of different diameters.

16. Apparatus as recited in claim 3 wherein said grid is formed of a first layer of spaced parallel bars having a superimposed second layer of spaced parallel bars extending angularly of said first layer of spaced parallel bars.

17. Apparatus as recited in claim 16 wherein said rods are attached to the corners formed by said first and second layers of spaced parallel bars.

18. Apparatus as recited in claim 16 wherein said first and second layers of spaced parallel bars form diamond shaped openings.

19. Apparatus as recited in claim 18 wherein said rods are integrally secured at the intersection of said first and second layers of spaced parallel bars.

20. Apparatus as recited in claim 1 wherein some of said rods extend below the lower face of said packing support plate.

* * * * *